United States Patent [19]

Wolcott

[11] Patent Number: 5,136,878
[45] Date of Patent: Aug. 11, 1992

[54] AIR COOLED DYNAMOMETER VEHICLE EMISSONS TEST STAND

[75] Inventor: John H. Wolcott, Racine, Wis.

[73] Assignee: Eaton Corporation, Cleveland, Ohio

[21] Appl. No.: 736,955

[22] Filed: Jul. 29, 1991

[51] Int. Cl.$^5$ .............................................. G01M 15/00
[52] U.S. Cl. ...................................... 73/117; 73/862.17
[58] Field of Search .................. 73/862.17, 117, 862.18

[56] References Cited

U.S. PATENT DOCUMENTS 2,311,684  2/1943  Okamura et al. ................. 73/862.17
2,334,976  11/1943  Winther ........................... 73/862.17 X Primary Examiner—Jerry W. Myracle
Attorney, Agent, or Firm—M. L. Union

[57] ABSTRACT

An air-cooled eddy current dynamometer for the use in a vehicle emissions test stand application. The dynamometer housing includes an air inlet manifold for drawing cooling air radially inwardly into the dynamometer and an air outlet manifold permitting the expulsion of heated air tangentially outwardly from the dynamometer. An end of the dynamometer housing has a plurality of openings therein allowing cooling air to be drawn axially inwardly into the dynamometer housing. The combination of air flows radially inwardly through the inlet manifold, axially inwardly through the openings in the end of the dynamometer and tangentially outwardly through the outlet manifold significantly increases the cooling of the dynamometer permitting its use in a vehicle test stand application wherein the dynamometer is placed in a recess or pit within the floor of the structure in which the test stand is installed. In such an installation, the outlet manifold portion of the dynamometer is positioned so that the heated cooling air from the dynamometer is directed tangentially outwardly from the recess or pit in a path that is substantially parallel to and above the surface of the floor in which the test stand is installed.

14 Claims, 5 Drawing Sheets

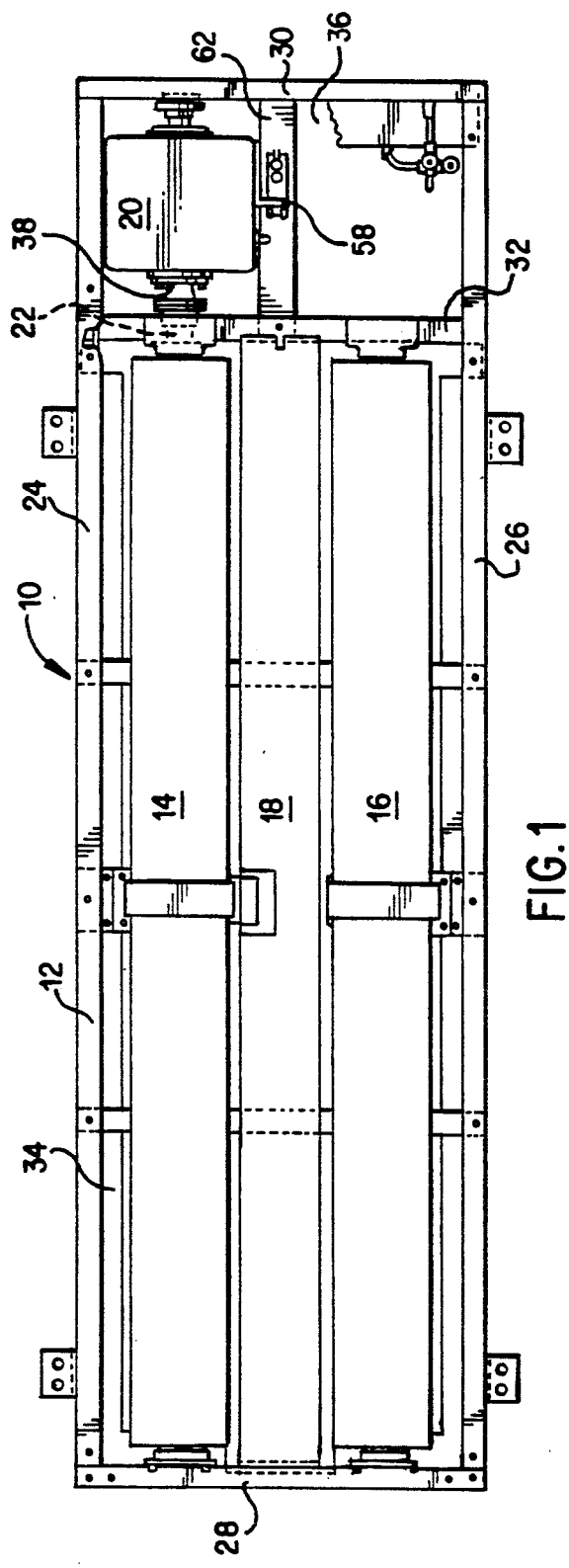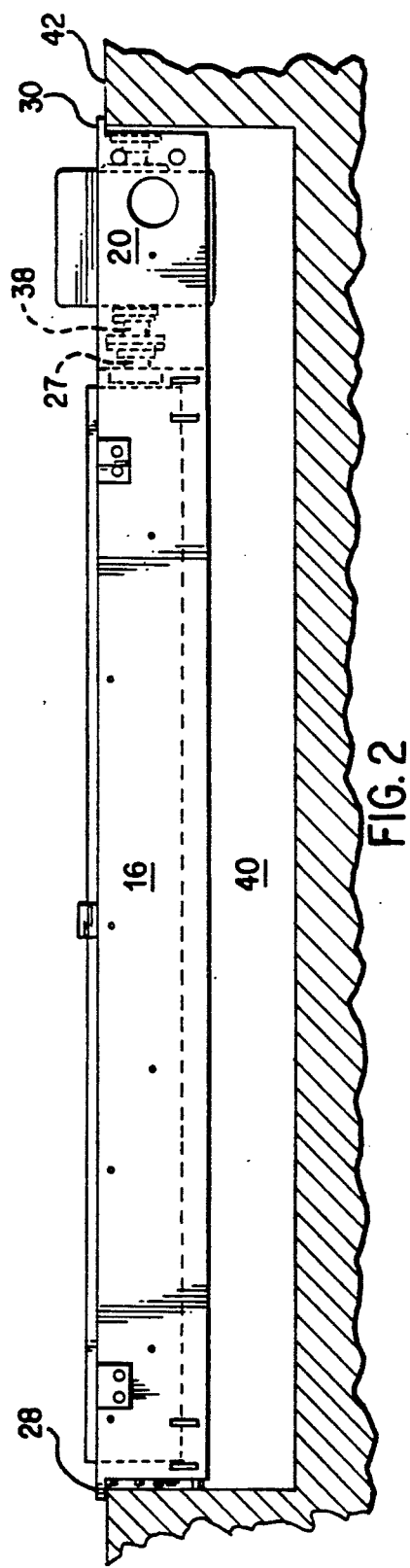

AIR COOLED DYNAMOMETER VEHICLE EMISSONS TEST STAND

TECHNICAL FIELD

The present invention relates, in general, to a vehicular emissions test stand and, more particularly, to a test stand that utilizes a dynamometer having a unique construction which facilitates the cooling of same.

BACKGROUND ART

Test stands such as those utilized for vehicle emissions testing can incorporate a dynamometer for applying appropriate loads to the vehicle being tested. Such loads (retarding torques) can be transmitted to the vehicle tires via spaced-apart rollers which support the drive wheels of the vehicle. In order to facilitate testing, the dynamometer is typically placed in a recess or pit in the surface of the floor so that the vehicle can be driven directly onto the spaced-apart rollers. Because the dynamometer is confined within the recess or pit, and since the dynamometer might be of the eddy current type which generates a significant amount of heat, cooling of the dynamometer is necessary. Such cooling is typically accomplished by fan blades on the rotating member of the dynamometer which cause air to enter and exit the dynamometer housing. It has been found that the volume of air drawn into and expelled from the dynamometer through the use of such fan blades is not sufficient to effectively cool the dynamometer since a substantial portion of the dynamometer is confined within a pit or recess in the floor. A considerable portion of the hot air being discharged from the dynamometer recirculates within the pit or recess and is subsequently drawn back into the air inlet of the dynamometer and reheated resulting in a drastic reduction in the thermal dissipation capacity of the dynamometer. In order to circumvent these problems, an auxiliary blower system is typically attached to an inlet manifold on the dynamometer to increase the amount of air passing therethrough and to ventilate the pit or recess to prevent recirculation. The use of such a blower system, however, significantly increases the overall cost of the vehicle test stand.

DISCLOSURE OF THE INVENTION

The present invention provides a vehicle test stand wherein the housing for the eddy current dynamometer used for applying a retarding torque to the drive wheels of the vehicle being tested has an inlet and an outlet manifold provided therein permitting the passage of air therethrough to cool the dynamometer. The outlet manifold is oriented such that the heated air is discharged in a defined tangential path with respect to the housing. Thus, the dynamometer can be placed within the recess or pit in the floor of the structure which houses the test stand and oriented such that the outlet air is totally discharged from the recess or pit and is directed substantially parallel to and above the surface of the floor in order to cool the dynamometer and prevent recirculation of hot air within the recess or pit.

The dynamometer constructed in accordance with the present invention includes a housing consisting of an end plate, a cover plate and a circumferential housing member interposed therebetween. The cover plate includes an inlet manifold oriented to draw cooling air radially inwardly into the dynamometer housing. A plurality of openings are spaced about the center of the end plate permitting the passage of additional cooling air into the housing. The circumferential housing member includes an outlet manifold oriented to expel the heated air tangentially outwardly from the dynamometer. The inductor drum which rotates within the circumferential housing member has axially directed fins on either end thereof to impel the flow of cooling air through the housing. The combination of air flows radially inwardly through the inlet manifold in the cover plate, axially inwardly through the openings in the end plate, and tangentially outwardly through the outlet manifold in the circumferential housing member significantly increases the cooling of the dynamometer permitting its use in a vehicle test stand wherein the dynamometer is placed in a recess or pit and oriented such that the heated cooling air from the dynamometer is directed out of the recess or pit in a path that is substantially parallel to and above the surface of the floor in which the test stand is received.

In a preferred embodiment of the present invention, a vehicle test stand includes a dynamometer located in a pit in the floor of a structure housing the test stand and support means for supporting the drive wheels of the vehicle to be tested. The dynamometer includes an input member, an output member, an inductor assembly connected to the input member, a pole assembly connected to the output member, and a field coil energizable to electrically couple the pole assembly to the inductor assembly. The support means are driven by the wheels of the vehicle to be tested and are connected to the input member of the dynamometer to drive same in response to the support means being driven by the vehicle drive wheels. When energized, the field coil couples the pole assembly and the inductor assembly and the input and output members applying a retarding torque to the drive wheels of the vehicle. The dynamometer also includes cooling means for circulating the flow of cooling medium through the dynamometer and into contact with the pole assembly, field coil and inductor assembly to absorb heat from same and baffle means for directing the flow of heated cooling medium away from the dynamometer and out of the pit preventing the heated cooling medium from subsequently passing through the dynamometer.

BRIEF DESCRIPTION OF THE DRAWINGS

FIG. 1 is a top plan view of the vehicle test stand of the present invention.

FIG. 2 is a front elevational view, partially broken away in cross section, of the structure illustrated in FIG. 1.

BEST MODE FOR CARRYING OUT THE INVENTION

Figure 3:
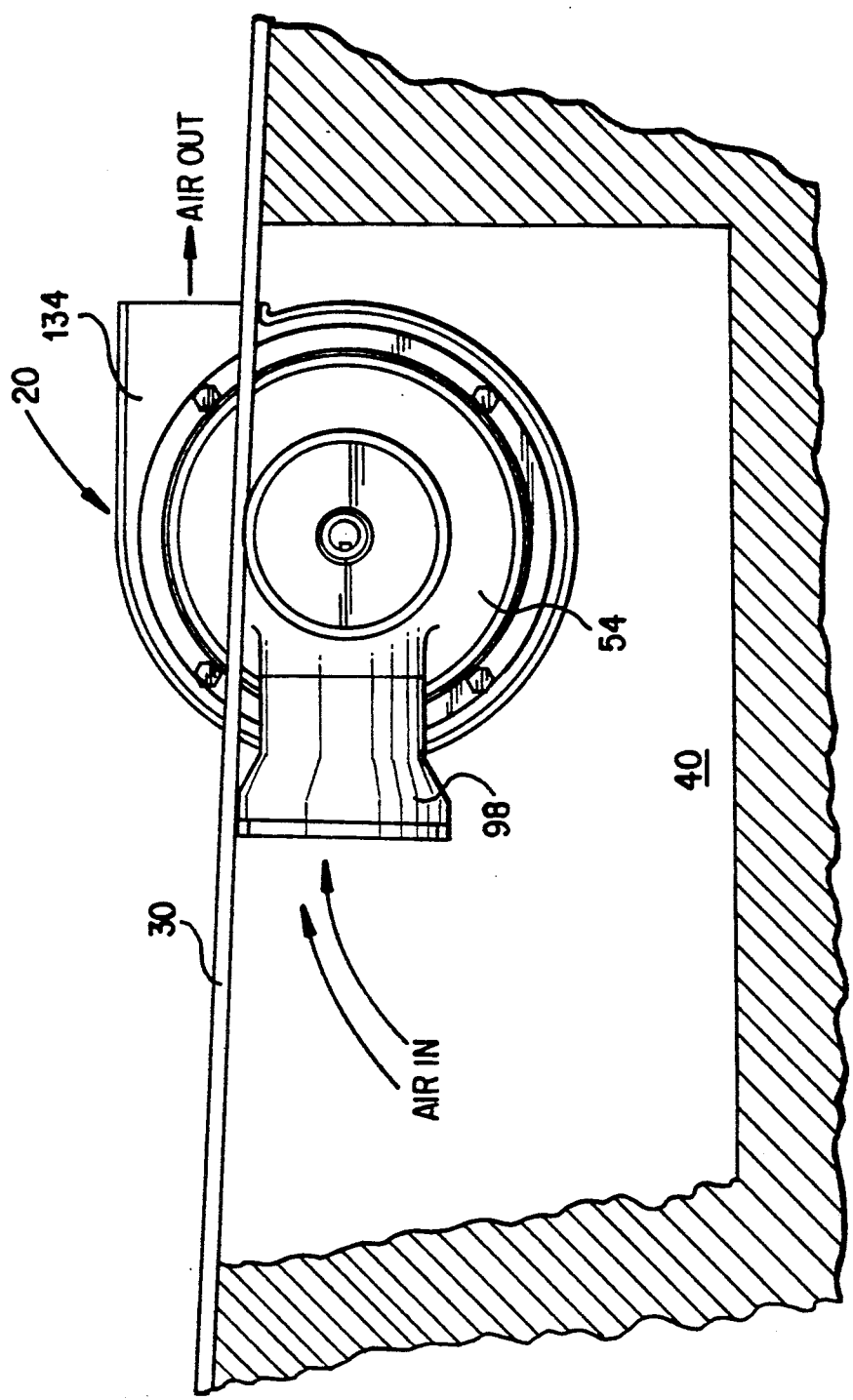
FIG. 3 is an end elevational view, partially broken away in cross-section, illustrating the elevation of the dynamometer relative to the recess or pit in which it is installed.

Referring now to the drawings where the illustrations are for the purpose of describing the preferred embodiment of the present invention and are not intended to limit the invention described herein, FIG. 1 is a top plan view of the vehicle test stand 10 of the present invention. The test stand 10 includes a frame 12 having a substantially rectangular configuration, two axially extending rollers 14 and 16 supported in a substantially parallel, spaced-apart relationship within the frame 12, a spacer plate 18 interposed between the rollers 14 and 16, and an eddy current dynamometer 20 connected to an end 22 of roller 14.

Frame 12 is comprised of two substantially parallel frame members 24 and 26, interconnected at their respective adjacent ends by two substantially parallel frame members 28 and 30 to form a structure having a substantially rectangular configuration. A frame cross member 32, which is substantially parallel to frame members 28 and 30, interconnects frame members 24 and 26 and is positioned so as to be in closer proximity to frame member 30 than to frame member 28 resulting in the formation of a first frame portion 34, enclosed by frame member 28, frame cross member 32 and portions of frame members 24 and 26, and a second frame portion 36, enclosed by frame cross member 32, frame member 30, and remaining portions of frame members 24 and 26. First frame portion 34 contains rollers 14 and 16 and spacer plate 18, whereas second frame portion 36 has dynamometer 20 located therein. The rollers 14 and 16, which have an axial length greater than the span across the tires of the vehicle being tested, are spaced apart to support ("cradle") the vehicle tires during the testing procedure. Each end of the rollers 14 and 16 is provided with a journal which is received within a bearing that is attached to frame member 28 and cross member 32 by fasteners. The spacer plate 18 is interposed between the rollers 14 and 16 and is similarly attached to frame member 28 and cross member 32 by fasteners. The elevation of rollers 14 and 16 relative to spacer plate 18 is such so as to allow the rollers 14 and 16 to support the vehicle tires above the spacer plate 18. The dynamometer 20 is received within second frame portion 36 and its input shaft 38 is coupled to end 22 of roller 14. The complete test stand 10 including the frame 12, rollers 14 and 16, spacer plate 18 and dynamometer 20 is received within a recess or pit 40 provided in the floor 42 of a structure, as shown in FIGS. 2 and 3, which are a front elevational view and an end elevational view, respectively, of the dynamometer 20 installed in recess or pit 40.

Figure 4:
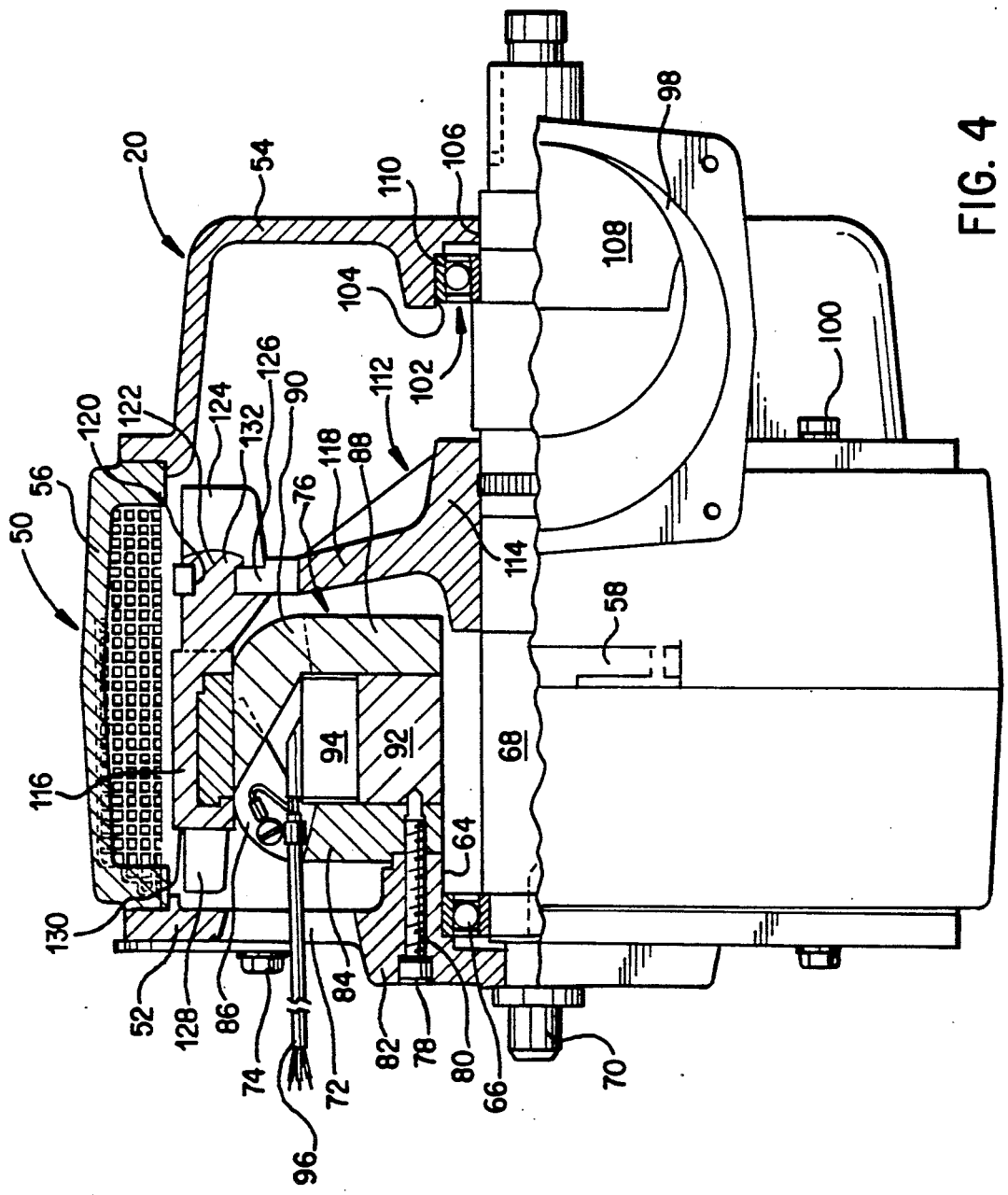
FIG. 4 is a front elevational view, partially broken away in cross-section, of the dynamometer utilized in the present invention.
Figure 5:
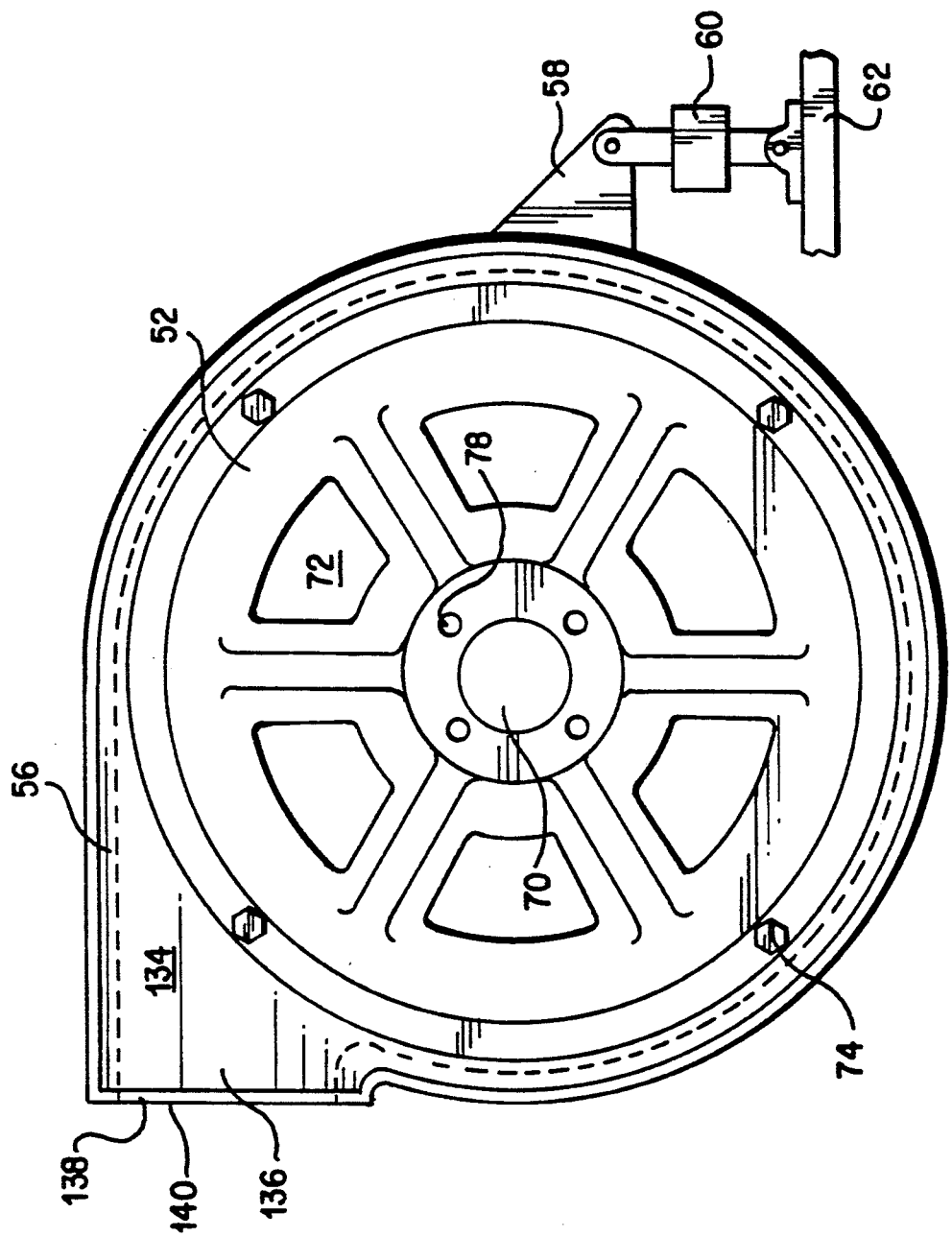
FIG. 5 is a left end view of the dynamometer illustrated in FIG. 4.
Figure 6:
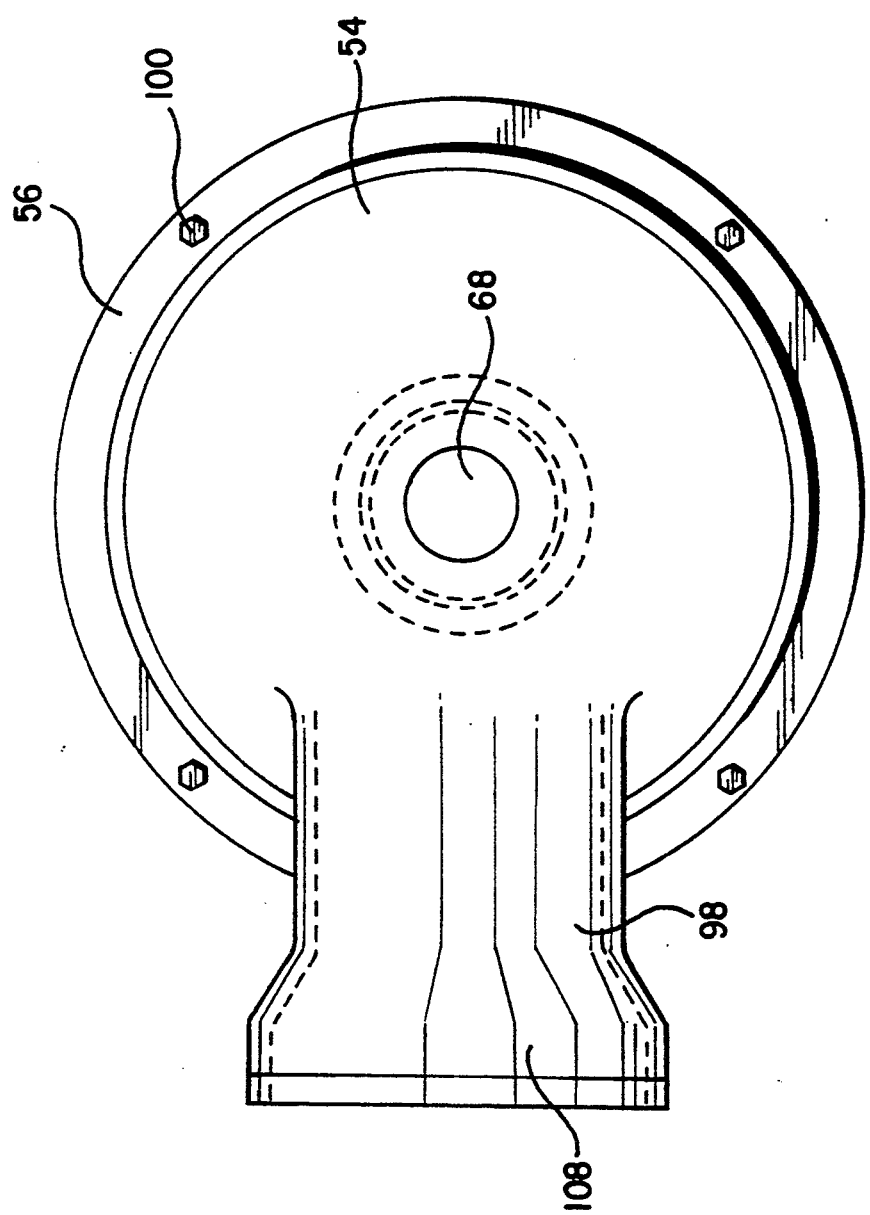
FIG. 6 is a right end view of the dynamometer illustrated in FIG. 4.

As shown in FIGS. 4 through 6, the dynamometer 20 includes a housing, shown generally by the numeral 50, comprising an end plate 52, a cover plate 54 and a circumferential housing member 56 interposed therebetween. A radially extending ear 58 is attached to the exterior of the circumferential housing member 56 permitting the pivotal attachment of the dynamometer 20 via torque measuring means 60 to frame member 62 within second frame portion 36, as shown in FIGS. 1 and 5. Torque measuring means 60 produces an electrical signal proportional to the torque applied to the dynamometer 20 and is utilized to indicate and control the amount of torque produced. Frame member 62 interconnects frame member 30 to frame cross member 32 and is substantially parallel to frame members 24 and 26. The end plate 52 of the housing 50 is generally circular in configuration and has a bore portion 64 for locating and supporting a ball bearing 66 and one end of a shaft 68. Projecting axially from end plate 52 is a mounting trunnion adapter 70 which is received within a pillow block bearing (not shown) to pivotally support the dynamometer 20. A plurality of substantially equally angularly spaced openings 72 are provided about the center of end plate 52 providing passageways for air and electrical conductors into the dynamometer 20. The diameter of the end plate 52 approximates the diameter of the circumferential housing member 56. End plate 52 is attached to one end of the circumferential housing member 56 by fasteners 74 which are received through spaced apart bores positioned on a bolt circle adjacent the periphery of the end plate 52 and which threadedly engage the housing member 56. The end plate 52 supports a fixed pole assembly 76 by fasteners 78 which are received through spaced-apart bores 80 positioned on a bolt circle in the hub portion 82 of the end plate 52 and which threadedly engage the pole assembly 76. The fixed pole assembly 76 includes a first stamped pole plate 84 having eight axially directed pole teeth 86 around the periphery thereof and a second stamped pole plate 88 also having eight axially directed pole teeth 90 around the periphery thereof. The pole teeth 86 and 90 are equally angularly spaced on their respective pole plates 84 and 88 and are interdigitated forming air flow gaps therebetween. The air flow gaps between the pole teeth 86 and 90 promote air circulation and cooling of the pole assembly 76. An axially extending annular support member 92 is provided to support a field coil 94 and is affixed to pole plates 84 and 88 to positively locate the pole plates 84, 88 relative to each other. The field coil 94 is adapted to be energized in a well known manner by electrical leads 96 which pass through opening 72 for connection to a source of electrical power.

The cover plate 54 is also generally circular in configuration and has a radially directed inlet manifold portion 98 provided therein. The diameter of the circular portion of the cover plate 54 approximates the diameter of the circumferential housing member 56. Cover plate 54 is attached to the opposite end of the circumferential housing member 56 by fasteners 100 which are received through spaced-apart bores positioned on a bolt circle adjacent the periphery of the cover plate 54 and which threadedly engage the housing member 56. A stepped bore, shown generally by the numeral 102, is provided in the approximate center of the circular portion of the cover plate 54. The stepped bore 102 includes a first bore portion 104 and a second bore portion 106; first bore portion 104 having a diameter greater than second bore portion 106. The radially directed inlet manifold portion 98 has a substantially cylindrical opening 108 provided therethrough. The axis of cylindrical opening 108 is substantially perpendicular to and coincident with the axis of stepped bore 102.

The shaft 68 is received through housing 50 and is supported therein by means of ball bearings 66 and 110 located within bore portion 64 and first bore portion 104 in end plate 52 and cover plate 54, respectively. An inductor drum assembly 112 is adapted to be secured to the shaft 68 to rotate therewith. The inductor drum assembly 112 includes a radially extending hub portion 114 and an axially extending drum portion 116 which is composed of a ferro-magnetic material such as steel and which may have a substantially uniform magnetic reluctance. The radially extending hub portion 114 is affixed to the shaft 68 by means well known in the art, such as a key or knurl. The radial distance between the surface of the shaft 68 and the inner surface of the axially extending drum portion 116 approximates the radial thickness of the fixed pole assembly 76. A narrow radial air gap or clearance is maintained between the axially extending drum portion 116 and the pole assembly 76 to permit relative rotation therebetween. The width of the air gap is minimized to optimize magnetic coupling between the inductor drum assembly 112 and the pole assembly 76. The radially extending hub portion 114 includes a plurality of radially extending legs 118 substantially equally angularly spaced around the center thereof; each leg 118 having an aperture 120 therethrough. The axially extending drum portion 116 has a plurality of axially extending lugs 122 and axially extending cooling fins 124 projecting from circumferential radial surface 126 of drum portion 116. A plurality of axially extending cooling fins 128 project from oppositely disposed circumferential radial surface 130 of drum portion 116. The radial location of the lugs 122 on circumferential radial surface 126 and apertures 120 in legs 118, and the angular spacing between same, is such that each lug 122 is receivable through a complementary aperture 120 in the legs 118 allowing the attachment of the axially extending drum portion 116 to the radially extending hub portion 114 of the inductor drum assembly 112. Attachment is achieved by deforming the ends 132 of each lug 122 after its receipt in its complementary aperture 120 in leg 118. The axially extending cooling fins 124 are substantially equally angularly spaced between the lugs 122 and the axially extending cooling fins 128 are substantially equally angularly spaced on the circumferential radial surface 130 of the axially extending drum portion 116.

The inlet manifold portion 98 of the cover plate 54 directs air in a radial direction into the dynamometer 20 and permits the air to pass over the axially extending cooling fins 124 and 128 provided on the axially extending drum portion 116 to cool same. The circumferential housing member 56 is provided with a tangentially directed manifold portion 134 having a substantially rectangular opening 136 therethrough providing an outlet for the air which has passed through and been heated within the dynamometer 20. A protective covering 138, such as a screen, may be placed over the outlet 140 of the tangentially directed manifold portion 134 preventing foreign matter from entering the dynamometer 20. The axis of the tangentially directed outlet manifold portion 134 is substantially parallel to the axis of the radially directed inlet manifold portion 98 and is perpendicular to and radially spaced from the longitudinal axis of the shaft 68. In this manner, the direction of the air flows into the inlet manifold portion 98 and from the outlet manifold portion 134 are substantially parallel to each other. The dynamometer 20 is positioned within the recess or pit 40 such that the direction of air flow from tangentially directed outlet manifold portion 134 is out of the recess or pit 40 and is substantially parallel to and above the surface of the floor 42 of the structure in which the test stand 10 is installed.

When a vehicle's emission system is to be tested, if the vehicle is a rear-wheel drive vehicle, the vehicle is driven onto the rollers 14 and 16 so that its rear tires engage same. Conversely, if the vehicle is a front-wheel drive, the vehicle is driven onto the rollers 14 and 16 so that its front tires engage same. The tires of the vehicle are then permitted to drive the rollers 14 and 16, and the field coil 94 is energized to establish a flux path which couples the pole assembly 76 with the inductor drum assembly 112. Since the circumferential housing member 56 is attached to frame member 62 by the radially extending ear 58 and torque measuring means 60, coupling of the inductor drum assembly 112 to the pole assembly 76 results in braking of the shaft 68. The degree of coupling or braking, as is well known, is controlled by the magnitude of current passing through the field coil 94.

The coupling of the inductor drum assembly 112 to the pole assembly 76 to brake the shaft 68 generates heat in a well known manner. The heat generated by the "slip", i.e., the difference in the rotational speed of the inductor drum assembly 112 with respect to the pole assembly 76 is concentrated in the axially extending portion 116 and the radially extending portion 114 of the inductor drum assembly 112, in the field coil 94, annular support member 92, pole plates 84, 88, and in the pole teeth 86 and 90. Accordingly, cooling of the dynamometer 20 is critical in order to maximize the braking capacity thereof. It has been found that the location and orientation of the inlet manifold portion 98 and outlet manifold portion 134 in the cover plate 54 and circumferential housing member 56, respectively, promotes cooling of the dynamometer 20. When the inductor drum assembly 112 rotates with the shaft 68, the axially extending cooling fins 124 establish a flow of cooling air inwardly through radially directed inlet manifold portion 98 in cover plate 54 and outwardly through the tangentially directed outlet manifold portion 134 in the circumferential housing member 56. Similarly, the axially extending cooling fins 128 establish a flow of cooling air inwardly through openings 72 in end plate 52 and outwardly through the tangentially directed outlet manifold portion 134. The foregoing flows of air create a negative pressure at the air gap between the pole teeth 86, 90 and the inductor drum assembly 112 drawing air over air the pole teeth 86, 90 to cool same and drawing air over the axially extending portion 116 of the inductor drum assembly 112 and the field coil 94. Thus, the combination of air flows radially inwardly through inlet manifold portion 98 in cover plate 54, axially inwardly through openings 72 in end plate 52, and tangentially outwardly through outlet manifold portion 134 in circumferential housing member 56 cools the dynamometer 20.

Even though the dynamometer 20 is received within a recess or pit 40, cooling of the dynamometer 20 is not adversely affected since it is positioned such that the direction of heated air flow from the outlet manifold portion 134 is out of the pit and substantially parallel to and above the surface of the floor of the structure in which the test stand is installed. In addition, by directing the heated air flow out of the pit, the volume of heated air that re-enters the pit and circulates through the dynamometer is minimized. The foregoing results in a lower cooling air temperature within the recess or pit which, in turn, results in improved cooling of the dynamometer 20.

From the foregoing it should be apparent that a new and improved vehicle test stand has been provided which utilizes an eddy current dynamometer for applying a retarding torque to the drive wheels of the vehicle being tested. The housing for the dynamometer has an inlet manifold for drawing cooling air into the dynamometer and an outlet manifold for expelling heated air from the dynamometer and out of the recess or pit. In this manner the dynamometer is effectively cooled even though it is "confined" within a recess or pit.

I claim:

1. A vehicle test stand adapted to apply a predetermined retarding torque to the drive wheels of a vehicle to be tested comprising, a dynamometer adapted to be located in a pit in a floor of a structure housing the test stand and support means for supporting the drive wheels of a vehicle to be tested, said dynamometer adapted to be disposed within the pit, said dynamometer comprising an input member, an output member, a pole assembly connected to one of said input and output members, an inductor assembly connected to the other of said input and output members, field means for electrically coupling said pole assembly to said inductor assembly by establishing a flux path from said field means through said pole assembly, through said inductor assembly and to said field means to magnetically couple said pole assembly and said inductor assembly, said support means being operable to be driven by the wheels of a vehicle to be tested and being operable to apply a controllable retarding torque to the drive wheels of the vehicle to be tested, said support means being connected to said input member for driving said input member in response to said support means being driven by said drive wheels of the vehicle, said field means being energizable to couple said pole assembly and said inductor assembly and said input and output members to apply a predetermined retarding torque which is dependent upon the energization of said field means to the drive wheels of the vehicle to be tested, and cooling means for circulating the flow of a cooling medium through said dynamometer and into contact with said pole assembly, said field means and said inductor assembly to transfer heat from said pole assembly, said field assembly and said inductor assembly to said cooling medium, said cooling means including baffle means for directing the flow of cooling medium away from said dynamometer and out of the pit after said cooling medium absorbs heat from said pole assembly, said field means and said inductor assembly to prevent the heated cooling medium from passing through said dynamometer.

2. A vehicle test stand adapted to apply a predetermined retarding torque to the drive wheels of a vehicle to be tested as defined in claim 1 wherein said output member is fixed and said input member is rotatable relative to said output member, said relative rotation between said input and output member generating heat in said pole assembly, said inductor assembly and said field means, said heat generated being proportional to the relative rotation between said input and output members and energization of said field means.

3. A vehicle test stand adapted to apply a predetermined retarding torque to the drive wheels of the vehicle to be tested as defined in claim 2 wherein said dynamometer further includes a housing substantially enclosing said input member, said output member, said pole assembly, said inductor assembly and said field means, said housing including an inlet portion for directing the flow of cooling medium into said housing and an outlet portion for directing the flow of cooling medium away from said dynamometer and out of the pit after said cooling medium absorbs heat from said pole assembly, field means and said inductor assembly.

4. A vehicle test stand adapted to apply a predetermined retarding torque to the drive wheels of the vehicle to be tested as defined in claim 3 wherein said support means comprises roller means operatively connected to said input member for rotation therewith.

5. A vehicle test stand adapted to apply a predetermined retarding torque to the drive wheels of a vehicle to be tested as defined in claim 4 wherein said outlet portion of said housing is positioned substantially above the floor of the structure in which the pit is located and is operable to direct the flow of cooling medium from said housing out of the pit in a direction substantially tangentially outwardly from said housing.

6. A vehicle test stand adapted to apply a predetermined retarding torque to the drive wheels of a vehicle to be tested as defined in claim 5 wherein said inlet portion of said housing is oriented so as to direct the flow of cooling medium radially inwardly into said housing.

7. A vehicle test stand adapted to apply a predetermined retarding torque to the drive wheels of a vehicle to be tested as defined in claim 5 wherein said outlet portion of said housing is oriented so as to direct the flow of cooling medium tangentially outwardly from said housing.

8. A vehicle test stand adapted to apply a predetermined retarding torque to the drive wheels of a vehicle to be tested as defined in claim 5 wherein the axis of said inlet portion and the axis of said outlet portion of said housing are substantially parallel to each other.

9. A vehicle test stand adapted to apply a predetermined retarding torque to the drive wheels of a vehicle to be tested as defined in claim 5 wherein said inlet portion and said outlet portion of said housing are offset from each other along the longitudinal axis of said housing.

10. A vehicle test stand adapted to apply a predetermined retarding torque to the drive wheels of a vehicle to be tested comprising, a dynamometer adapted to be located in a pit in a floor of a structure housing the test stand and support means for supporting the drive wheels of a vehicle to be tested, said dynamometer adapted to be disposed within the pit, said dynamometer comprising an input member, an output member, a pole assembly connected to one of said input and output members, an inductor assembly connected to the other of said input and output members, field means and a housing substantially enclosing said input member, output member, pole assembly, inductor assembly and field means, said field means electrically coupling said pole assembly to said inductor assembly by establishing a flux path from said field means through said pole assembly, through said inductor assembly and to said field means to magnetically couple said pole assembly and said inductor assembly, said support means being operable to be driven by the wheels of a vehicle to be tested and being operable to apply a controllable retarding torque to the drive wheels of the vehicle to be tested, said support means being connected to said input member for driving said input member in response to said support means being driven by said drive wheels of the vehicle, said field means being energizable to couple said pole assembly and said inductor assembly and said input and output members to apply a predetermined retarding torque which is dependent upon the energization of said field means to the drive wheels of the vehicle to be tested, said housing including an inlet portion for directing the flow of cooling medium into said housing and an outlet portion for directing the flow of cooling medium away from said dynamometer and out of the pit after said cooling medium absorbs heat from said pole assembly, said field means and said inductor assembly.

11. A vehicle test stand adapted to apply a predetermined retarding torque to the drive wheels of a vehicle to be tested as defined in claim 10 wherein said outlet portion of said housing is positioned substantially above the floor of the structure in which the pit is located and is operable to direct the flow of cooling medium from said housing out of the pit in a direction substantially tangentially outwardly from said housing.

12. A vehicle test stand adapted to apply a predetermined retarding torque to the drive wheels of a vehicle to be tested as defined in claim 11 wherein said inlet portion of said housing is oriented so as to direct the flow of cooling medium radially inwardly into said housing and said outlet portion of said housing is oriented so as to direct the flow of cooling medium tangentially outwardly from said housing after absorbing heat from said pole assembly, said field means and said inductor assembly.

13. A vehicle test stand adapted to apply a predetermined retarding torque to the drive wheels of a vehicle to be tested as defined in claim 11 wherein the axis of said inlet portion and the axis of said outlet portion of said housing are substantially parallel to each other.

14. A vehicle test stand adapted to apply a predetermined retarding torque to the drive wheels of a vehicle to be tested as defined in claim 11 wherein said inlet portion and said outlet portion of said housing are offset from each other along the longitudinal axis of said housing.

* * * * *